United States Patent [19]

Ninane

[11] Patent Number: 5,135,734
[45] Date of Patent: Aug. 4, 1992

[54] PROCESS FOR REMOVING A RESIDUE CONTAINING SODIUM SULPHATE

[75] Inventor: Léon Ninane, Dombasle-sur-Meurthe, France

[73] Assignee: Solvay & Cie (Société Anonyme), Brussels, Belgium

[21] Appl. No.: 421,341

[22] Filed: Oct. 13, 1989

[30] Foreign Application Priority Data

Oct. 26, 1988 [FR] France ................. 88 14100

[51] Int. Cl.$^5$ .......................... A62D 3/00; B09B 5/00; E21C 41/16; C01F 11/46
[52] U.S. Cl. .................................... 423/659; 423/166; 423/193; 423/551; 423/555; 423/DIG. 20; 23/302 T; 166/275; 166/306; 299/5; 405/128
[58] Field of Search ............... 423/179, 163, 166, 164, 423/193, 551, 555, 659, DIG. 20; 299/5, 4; 405/128, 129; 166/275, 306

[56] References Cited

U.S. PATENT DOCUMENTS

| | | | |
|---|---|---|---|
| 3,724,898 | 4/1973 | Jacoby | 405/58 |
| 4,120,737 | 10/1978 | Berrie et al. | 423/163 |
| 4,223,949 | 9/1980 | Gill et al. | 299/5 |
| 4,247,525 | 1/1981 | Voeste | 423/242 |
| 4,576,513 | 3/1986 | Lindorfer et al. | 405/53 |
| 4,577,999 | 3/1986 | Lindorfer et al. | 405/128 |
| 4,692,061 | 9/1987 | Lindorfer et al. | 405/128 |
| 4,724,130 | 2/1988 | Statnick et al. | 423/179 |
| 4,886,393 | 12/1989 | Jahn-Held et al. | 405/128 |

FOREIGN PATENT DOCUMENTS

| | | |
|---|---|---|
| 0005301 | 11/1979 | European Pat. Off. |
| 2721878 | 11/1978 | Fed. Rep. of Germany |
| 3411998 | 10/1985 | Fed. Rep. of Germany |
| 1082436 | 9/1967 | United Kingdom |

OTHER PUBLICATIONS

Chemical Marketing Reporter, pp. 5 and 27 (Jul. 7, 1986).
Dale W. Kaufmann, "Sodium Chloride", American Chemical Society Monograph Series, Reinhold Publishing Corporation, Chapman & Hall, Ltd., London, pp. 142–185 (1960).
Kirk-Othmer Encyclopedia of Chemical Technology, Third Edition, vol. 21, John Wiley & Sons, pp. 247–249 (1983).
Te-Pang Hou, Ph. D., "Manufacture of Soda", Second Edition, Hafner Publishing Company, p. 237 (1969).

Primary Examiner—Gary P. Straub
Attorney, Agent, or Firm—Spencer, Frank & Schneider

[57] ABSTRACT

Process for removing an industrial residue containing sodium sulphate, in which the sodium sulphate in the residue 7 is treated with a calcium salt 12 to precipitate calcium sulphate 13, which is sent to a rock salt deposit 15, from which an aqueous solution of sodium chloride 16 is withdrawn.

The process applies to the residues from the desulphurization of fumes by means of sodium bicarbonate.

12 Claims, 4 Drawing Sheets

PROCESS FOR REMOVING A RESIDUE CONTAINING SODIUM SULPHATE

The invention relates to a process for removing industrial residues containing sodium sulphate.

Human activities produce large quantities of sulphur-containing residues which are ecologically harmful. Thus, the burning of fossil fuels (coal, oil derivatives), especially in thermal power stations for producing electricity, results in the formation of a large volume of sulphur oxides, whose discharge into the atmosphere is generally not acceptable.

A known and recommended technique for purifying combustion gases from sulphur oxides consists in treating the latter with sodium carbonate or bicarbonate (Chemical Marketing Reporter, Jul. 7, 1986, pages 5 and 27: "Sodium Chemicals Get Nod for Commercial FDG in '90's"); the sulphur oxides in the treated gas are thereby converted into sodium sulphate, which can be easily separated from gas. This known technique secures an efficient purification of industrial fumes from sulphur oxide, but it results in the formation of a residue containing sodium sulphate, whose removal presents difficulties. The high solubility of sodium sulphate in water prohibits, in fact, its discharge as such at a dump or a tip. To solve these difficulties, thought has been given to making the residue containing sodium sulphate impervious by mixing fly ash, clay and water therewith (ibidem). This process of rendering impervious, however, presents the disadvantage of requiring a number of different raw materials and it involves complicated and costly equipment. Furthermore, it makes it necessary to tie up waste beds for the storage of residues which are made impervious at a dump.

The invention is aimed at providing a new process which makes it possible to remove the industrial residues containing sodium sulphate easily and economically, without making it necessary to tie up a waste bed, and which results, furthermore, in obtaining an industrial product which can be reclaimed.

The invention relates, consequently, to a process for removing an industrial residue containing sodium sulphate, according to which the sodium sulphate in the residue is treated with a calcium salt to precipitate calcium sulphate, the calcium sulphate is sent to a rock salt deposit, and an aqueous solution of sodium chloride is simultaneously withdrawn from the deposit.

In the process according to the invention, the calcium salt must be chosen from those which are capable of decomposing sodium sulphate to form calcium sulphate. Preference is given to calcium chloride, so as to produce sodium chloride simultaneously with the production of calcium sulphate.

In the process according to the invention, the treatment of sodium sulphate in the residue with the calcium salt must be carried out at a temperature which is adjusted for crystallizing calcium sulphate. In practice it is preferred to choose a temperature at which calcium sulphate dihydrate is crystallized.

The treatment of sodium sulphate with the calcium salt is generally carried out in an aqueous medium. The degree of dilution of sodium sulphate and of the calcium salt in the aqueous medium is not critical, and its optimum value can be easily determined by routine laboratory work, as a function of the other operating conditions.

To treat the sodium sulphate in the residue with the calcium salt it is possible, for example, to disperse the residue containing the sodium sulphate in the solid state in an aqueous solution or an aqueous suspension of the calcium salt. Alternatively, the residue can also be dispersed in a quantity of water which is sufficient to dissolve the sodium sulphate therein, and the calcium salt can then be mixed into the resulting aqueous medium. In this alternative form of the process the insoluble matter may be optionally separated from the sodium sulphate solution before the latter is treated with the calcium salt.

The calcium sulphate precipitate is next sent to a rock salt deposit, from which an aqueous solution of sodium chloride is extracted simultaneously.

Any suitable means may be employed for introducing the calcium sulphate precipite into the rock salt deposit and for extracting the aqueous solution of sodium chloride therefrom. A means which is commonly employed consists in introducing the calcium sulphate into the deposit in the form of an aqueous suspension in water or a saturated or diluted sodium chloride brine. For this purpose, it is advantageously possible to make use of the technique which consists in driving two pipelines into the rock salt deposit, in the vicinity of each other (usually a tubular pipeline and an annular pipeline, which are axial), in injecting the aqueous suspension of calcium sulphate under pressure into one of the pipelines and in withdrawing the aqueous solution of sodium chloride through the other pipeline (Dale W. Kaufmann, "Sodium Chloride", American Chemical Society Monograph Series, 1960, Reinhold Publishing Corporation, Chapman & Hall, Ltd, London, pages 142 to 185).

In a particular embodiment of the process according to the invention, the calcium sulphate precipitate is sent to the rock salt deposit with a quantity of water which is sufficient to dissolve therein a volume of rock salt which is at least equal to the volume of calcium sulphate. In this embodiment of the process according to the invention, the quantity of water which is used is consequently adjusted to form a cavity of sufficient volume in the deposit, by dissolving rock salt, to accommodate all the calcium sulphate which is sent therein and, if appropriate, the other insoluble substances of the residue.

It can happen that the industrial residue to be removed may contain soluble or insoluble substances which it is not recommended to discharge into the rock salt deposit or to reencounter in the aqueous sodium chloride solution. To this end, in another particular embodiment of the process according to the invention, the industrial residue is dispersed in a quantity of water which is sufficient to dissolve the sodium sulphate therein, the resultant aqueous solution is collected after the insoluble matter has been separated from it if appropriate, it is cooled under controlled conditions to crystallize sodium sulphate decahydrate, and the precipitate formed is collected and is treated with the calcium salt as set out above. In this embodiment of the process according to the invention, the precipitate of calcium sulphate decahydrate is of very high purity (Kirk-Othmer, Encyclopedia of Chemical Technology, 3rd edition, vol. 21, John Wiley & Sons, 1983, pages 247 to 249 (see page 249)). It may be associated with sodium carbonate decahydrate if the industrial residue subjected to the process contains sodium carbonate or bicarbonate, as is generally the case with residues obtained after the desulphurization of a fume gas with sodium carbonate or bicarbonate. This embodiment of the process according to the invention is specially recommended in the case of industrial residues contaminated with heavy metals.

In an alternative form of this embodiment of the process according to the invention, only a fraction of the precipitate of sodium sulphate decahydrate (possibly combined with sodium carbonate decahydrate) is treated with the calcium salt with a view to being sent to the rock salt deposit. The remaining fraction is used to treat a sodium chloride brine contaminated with calcium cations, to precipitate the latter in the form of calcium sulphate.

In a preferred embodiment of the process according to the invention, the calcium salt is calcium chloride originating from the calcium hydroxide treatment of the sodium bicarbonate mother liquor in the ammonia-soda process. In this embodiment of the process according to the invention, the treatment of sodium sulphate with calcium chloride may be carried out by mixing with sodium sulphate a residual liquor from a column for distilling the mother liquor from the manufacture of sodium bicarbonate by the ammonia process. Examples of constitution of these residues, in the form of dilute aqueous suspensions, are given in the treatise by Te-Pang Hou "Manufacture of Soda", second edition, Hafner Publishing Company, 1969, page 237, as well as in the publication "The Rehabilitation of the Solvay Process Waste Beds" by Frederick W. Boecker, B.S.C.E., Syracuse University, 1968, page 20. This embodiment of the process according to the invention has the advantage of employing only industrial residues, which are removed together into the rock salt deposit. It involves using a quantity of water which is capable of dissolving, in the deposit, a volume of rock salt which is at least equal to the total volume of the calcium sulphate and of the insoluble matter in the residual liquor from the soda unit. Alternatively, the residual liquor can be subjected to a filtration or a settling operation in order to remove from it beforehand the insoluble matter which it contains.

In another embodiment of the process according to the invention, the calcium chloride residue from the manufacture of sodium bicarbonate is used by means of the amine technique, such as described in patent GB-A-1,082,436 (Kaiser Aluminum & Chemical Corporation) and in the patents and patent applications BE-A-899,490 and EP-A-148,524 (Solvay & Cie).

The process according to the invention has the advantage of providing an easy, economical and reliable means for removing an industrial residue, without having to tie up a waste bed. It has the additional advantage of producing an aqueous solution of sodium chloride, which can be reclaimed in an industrial process.

The process according to the invention applies to all solid or liquid industrial residues containing sodium sulphate. It finds an advantageous application for the removal of the solid residues from the desulphurization treatment of gases containing sulphur oxides by means of sodium carbonate or bicarbonate. It solves advantageously the problem of the removal of such residues, originating from the treatment of the fumes from industrial furnaces which run on sulphur-containing fossil fuels, especially in thermal power stations for the production of electricity.

Special features and details of the invention will emerge from the following description of a few embodiments, with reference to the attached drawings.

In these figures, the same reference captions indicate identical parts.

Figure 1:
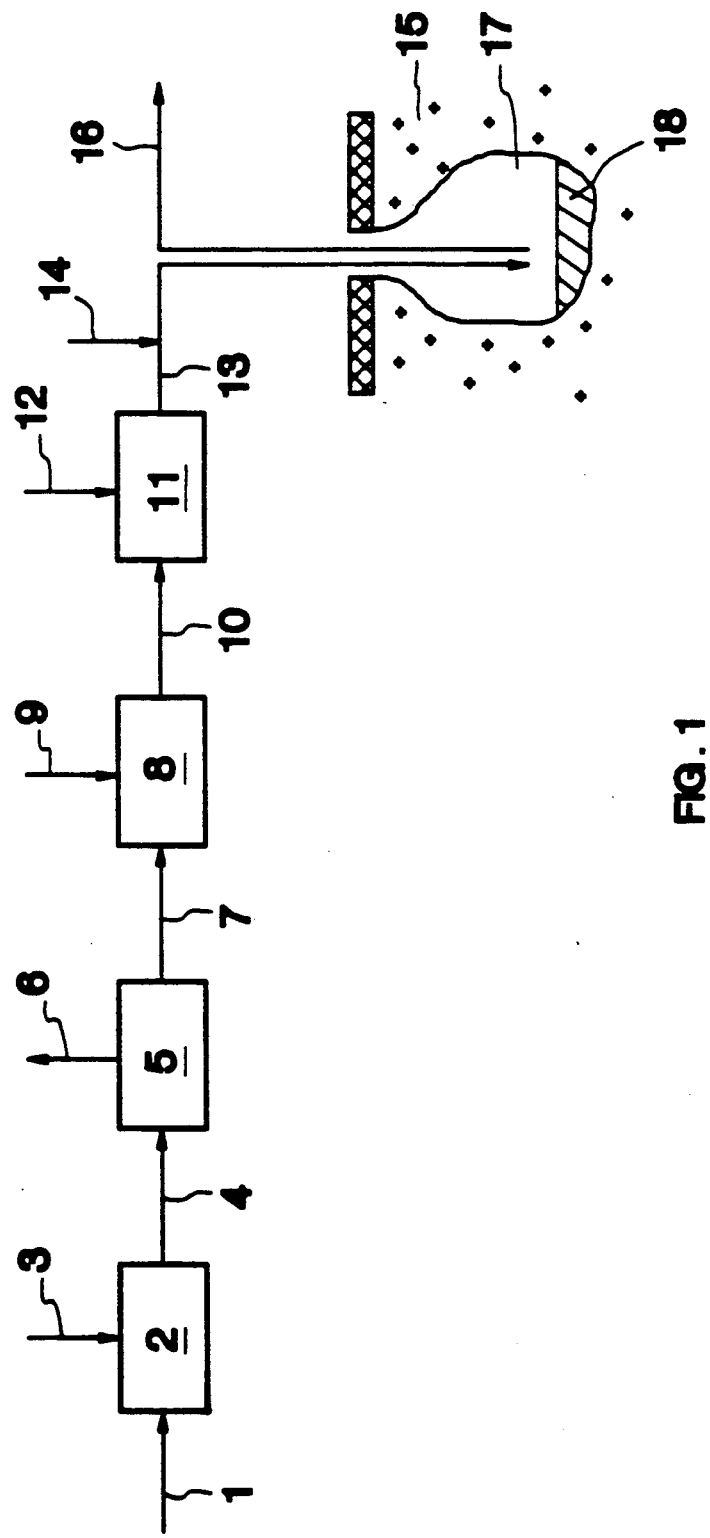
FIG. 1 is the diagram of a plant employing a first embodiment of the process according to the invention.
Figure 2:
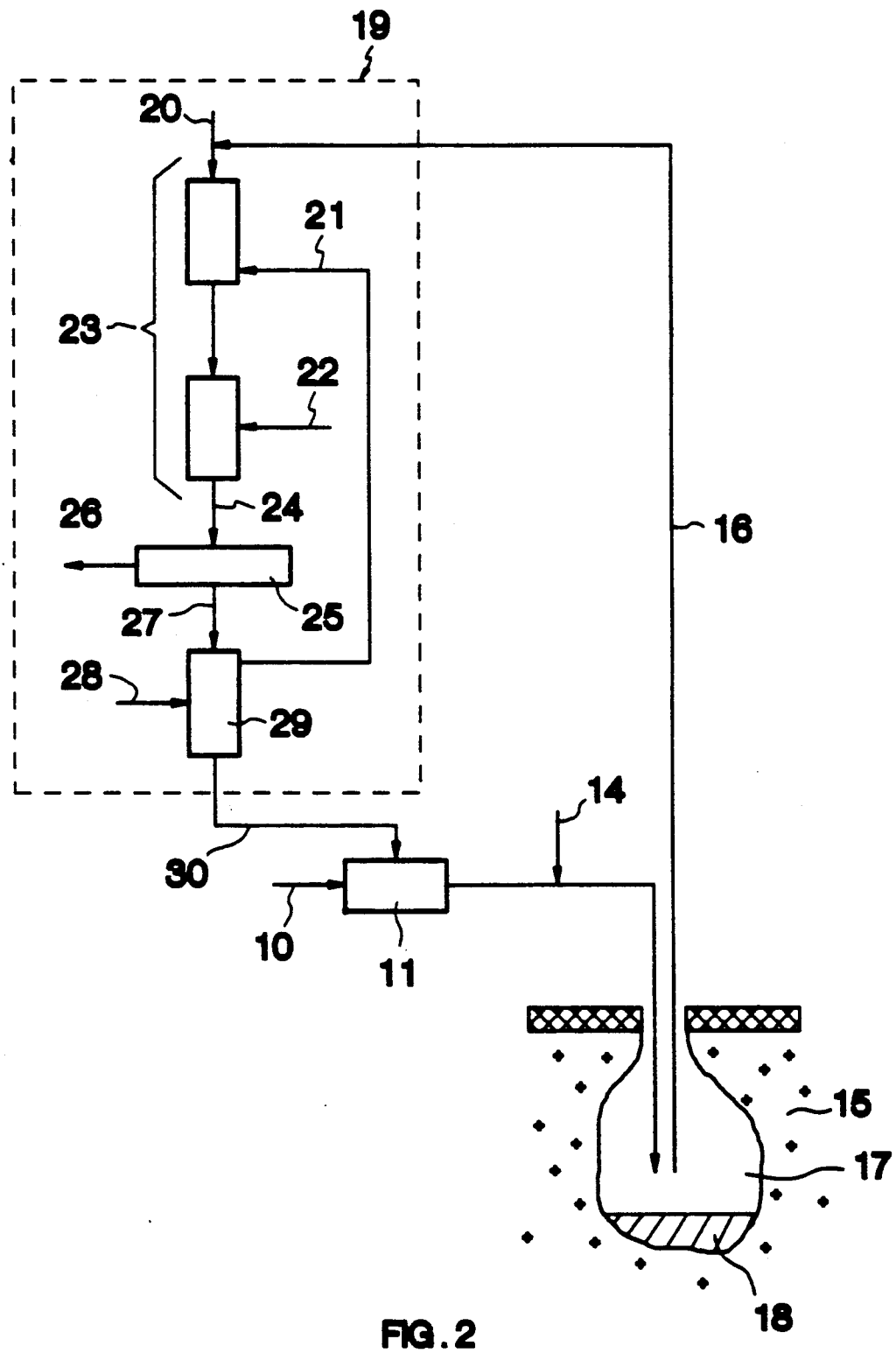
FIG. 2 is the diagram of a plant coupling an embodiment of the process according to the invention with a process for the manufacture of sodium bicarbonate.
Figure 3:
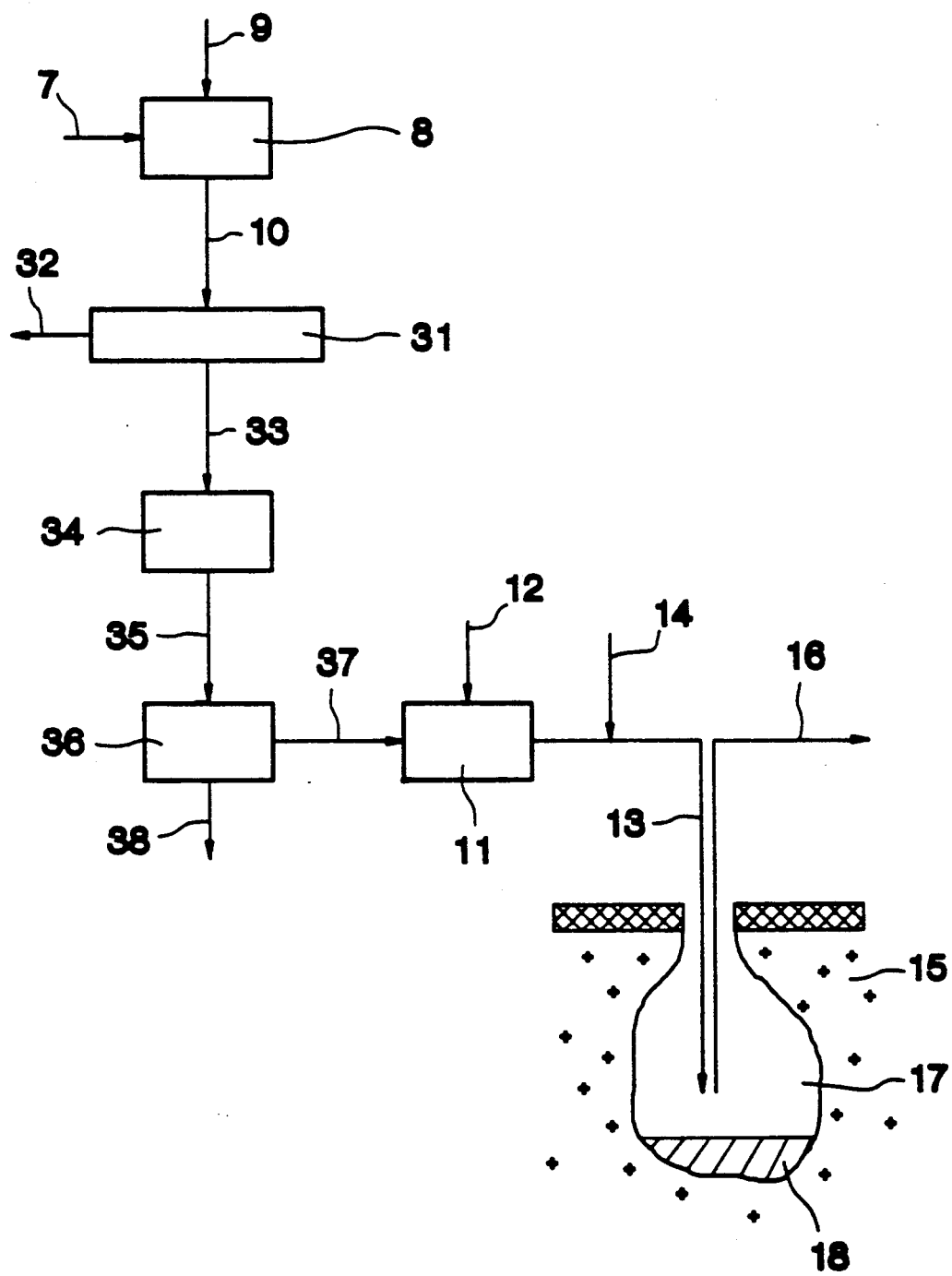
FIG. 3 is the diagram of a second embodiment of the process according to the invention.

In the plants shown diagrammatically in FIGS. 1 to 3, the process according to the invention is applied to the removal of a solid residue obtained after desulphurization of a fume gas originating from the burning of coal or of an oil derivative. To this end, the fume gas 1, contaminated with sulphur oxides, is introduced into a reactor 2, which is fed separately with sodium bicarbonate 3. In the reactor 2, the sulphur oxides from the fumes react with the sodium bicarbonate to form sodium sulphate. The gaseous reaction mixture 4 which is extracted from the reactor 2 is passed through a series of filters (advantageously including electrostatic filters) 5, where a gas 6, substantially free from dust, and a pulverulent solid residue 7 are separated. The latter contains sodium sulphate, sodium carbonate and the dust usually present in combustion gases (fly ash, heavy metals).

The residue 7 is treated in accordance with the process according to the invention.

In the embodiment of the process according to the invention used in FIG. 1, the solid residue 7 is introduced into a dissolving chamber 8, where water 9 is added to it in sufficient quantities to dissolve all the sodium sulphate and sodium carbonate in the residue 7. The resulting aqueous mixture 10 is conveyed to a crystallization chamber 11 which is also fed with an aqueous solution of calcium chloride 12, in sufficient quantity to decompose the sodium sulphate and carbonate and to form calcium sulphate and calcium carbonate, which precipitate, and sodium chloride, which goes into aqueous solution. The pressure and temperature conditions in the chamber 11 are adjusted to make the calcium chloride crystallize therein in the form of dihydrate or gypsum, preferably acicular in structure. An aqueous slurry 13 is collected from the crystallization chamber 11 and, after being made up with an additional quantity of water 14, is introduced into a subterranean rock salt deposit 15, from which an aqueous solution of sodium chloride 16 is withdrawn.

The unsaturated water of the aqueous slurry 13 dissolves the salt deposit 15, producing therein a cavity 17 in which the insoluble matter of the slurry (especially calcium sulphate) settles to form a solid deposit 18. The make-up water 14 must therefore be adjusted so that the volume of rock salt dissolved and extracted from the deposit with the solution 16 is at least equal to the volume of the solid matter in the slurry 13.

In an alternative embodiment of the process just described with reference to FIG. 1, the aqueous mixture 10 is subjected to a filtration, a settling operation or a centrifuging operation to extract the undissolved substances therefrom before it is sent to the crystallization chamber 11. This alternative embodiment of the process reduces the volume of insoluble matter introduced into the deposit; as a result, it requires a smaller addition of water 14 and reduces the rate of dissolution of the deposit and the flow rate of the sodium chloride solution 16 withdrawn from the deposit 15.

The plant shown in FIG. 2 combines the process according to the invention with an ammonia-soda unit 19. The ammonia-soda unit is well known in technology (TePang Hou "Manufacture of Soda", second edition, Hafner Publishing Company, 1969). In the latter, an aqueous sodium chloride solution 20, ammonia 21 and carbon dioxide 22 are reacted in a set 23 of reactors which are known per se, from which an aqueous slurry 24 of sodium bicarbonate is collected. Treatment of the slurry 24 on a filter 25 produces solid sodium bicarbonate 26, which is reclaimed, and a mother liquor 27, which is treated with an aqueous suspension of calcium hydroxide 28 in a reactor 29 comprising a distillation column fed with steam. From the reactor 29 there are separately collected, on the one hand, ammonia, which is recycled 21 and, on the other hand, a residual liquor 30. The latter is an aqueous slurry consisting essentially of a saturated aqueous solution of calcium chloride and of sodium chloride, containing various substances in suspension (especially calcium sulphate, calcium carbonate, magnesium hydroxide, iron oxides and silica).

According to the invention, the residual liquor 30 as such is introduced into the crystallization chamber 11, which is also fed with the aqueous mixture 10 containing the sodium sulphate from the solid residue to be removed.

In the embodiment of FIG. 2, the solid deposit 18 which forms in the cavity 17 of the rock salt deposit 15 contains solid substances which were in suspension in the residual liquor 30. The aqueous sodium chloride solution 16 withdrawn from the deposit 15 is sent to the soda unit 19.

In an alternative embodiment of the process shown diagrammatically in FIG. 2, the residual liquor 30 is subjected to a filtration or to a settling operation, so as to send to the chamber 11 only an aqueous solution of sodium chloride, substantially free from any solid substance.

The plant shown in FIG. 3 applies to the treatment of solid industrial residues which contain undesirable substances which one has no wish to reencounter in the solid deposit 18 of the rock salt deposit, nor in the aqueous sodium chloride solution 16 extracted from the deposit. Examples of such undesirable substances are heavy metals, which are present in variable quantities in some fuels.

In the plant of FIG. 3, the solid residue 7 containing sodium sulphate is first dispersed in water 9, in a dissolver 8, to dissolve the sodium sulphate. The quantity of water and its temperature are adjusted to disolve all of the sodium sulphate in the residue 7. The resulting aqueous suspension 10 is treated on a filter 31 to remove the insoluble matter 32. The filtrate 33 is sent to a crystallization chamber 34, where it is cooled to a controlled temperature, situated between $-1°$ C. and $32.4°$ C., to crystallize sodium sulphate decahydrate and sodium carbonate decahydrate. An aqueous slurry 35 is collected from the chamber 34 and is treated in a dewatering device 36 to separate the precipitate of sodium sulphate decahydrate and sodium carbonate decahydrate 37 from a mother liquor 38. The precipitate 37 is then subjected to a treatment similar to that of the aqueous medium 10 in the plant of FIG. 1. For this purpose, it is treated with an aqueous solution of calcium chloride 12 in a crystallization chamber 11 to convert the sodium sulphate into calcium sulphate and the sodium carbonate into calcium carbonate. The resulting aqueous slurry 13 is then sent to the salt deposit 15 with an additional quantity of water 14. Alternatively, the mother liquor 38 can be recycled to the dissolving chamber 8.

In an alternative form of embodiment of the process just described with reference to FIG. 3, the filtrate 33 is treated in two consecutive stages, in two successive crystallization chambers where pure sodium sulphate decahydrate, which is collected, is crystallized first of all, followed by a mixture of sodium sulphate decahydrate and sodium carbonate decahydrate.

Figure 4:
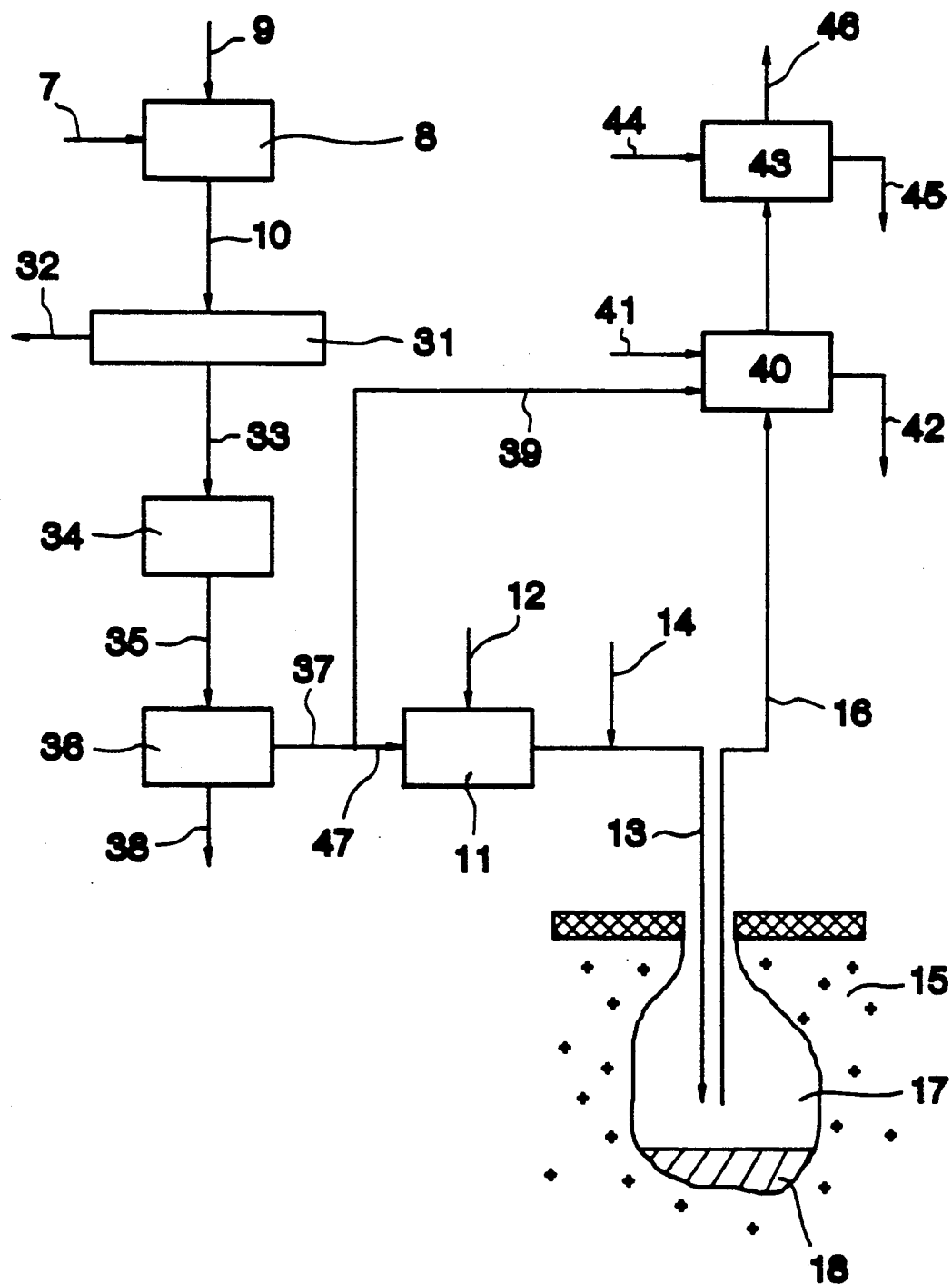
FIG. 4 is the diagram of a plant employing a third embodiment of the process according to the invention.

In the plant shown in FIG. 4, the solid residue 7 containing sodium sulphate is treated as in the plant of FIG. 3 to obtain a coprecipitate 37 of sodium sulphate decahydrate and of sodium carbonate decahydrate. The precipitate 37 is divided into two fractions 47 and 39. Fraction 47 is treated, as in the case of FIG. 3, with an aqueous solution of calcium chloride 12 in the crystallization chamber 11 to precipitate a mixture of calcium sulphate and of calcium carbonate; the resulting aqueous slurry 13 is sent, with an additional quantity of water 14, to the rock salt deposit 15, from which an aqueous sodium chloride solution 16 is extracted. The latter is generally contaminated with calcium and magnesium cations originating from the salt deposit. To purify it from these cations, the solution 16 is first treated, in a reactor 40, with fraction 39 of the precipitate 37, to precipitate the calcium cations in the form of calcium sulphate and of calcium carbonate. In addition, sodium hydroxide 41 is introduced into the reactor 40 to precipitate the magnesium cations in the form of magnesium hydroxide. After separation of the precipitates 42, the aqueous solution of sodium chloride is treated with sodium carbonate 44 in a second reactor 43, to complete its purification from calcium cations, which are removed in the form of a calcium carbonate precipitate 45. The sodium chloride solution 46 collected from the reactor 43 can be employed in various industries, especially for the manufacture of sodium carbonate by the ammonia process, or for the manufacture of chloride by electrolysis. In particular, the plant of FIG. 4 can be combined with the plant of FIG. 2.

I claim:
1. A process for removing sodium sulphate from a residue containing sodium sulphate, comprising the following successive steps:

dispersing a residue containing sodium sulphate in water and dissolving said sodium sulphate in said water to form an aqueous medium comprising a first aqueous sodium sulphate solution;

recovering said first aqueous sodium sulphate solution from said aqueous medium;

cooling said recovered first aqueous sodium sulphate solution under controlled conditions to crystallize sodium sulphate decahydrate and collecting said crystallized sodium sulphate decahydrate;

dissolving said crystallized sodium sulphate decahydrate in water to form a second aqueous solution of sodium sulphate;

contacting said second aqueous solution of sodium sulphate with a calcium salt to precipitate calcium sulphate and recovering precipitated calcium sulphate;

transferring the recovered precipitated calcium sulphate into a rock salt deposit and simultaneously withdrawing an aqueous solution of sodium chloride from said rock salt deposit.

2. The process according to claim 1, wherein the calcium sulphate precipitate is transferred to the rock salt deposit with a sufficient quantity of water to dissolve a volume of rock salt which is at least equal to the volume of the calcium sulphate and withdrawing an aqueous solution of sodium chloride from said rock salt deposit.

3. The process according to claim 1, wherein the second aqueous solution of sodium sulphate and the calcium salt are contacted under conditions to precipitate calcium sulphate dihydrate.

4. The process according to claim 1, wherein the calcium salt is calcium chloride.

5. The process according to claim 4, wherein the calcium chloride employed originates from a residual liquor resulting from the calcium hydroxide treatment of the mother liquor of sodium bicarbonate in the ammonia-soda process.

6. The process according to claim 5, wherein said second aqueous sodium sulphate is mixed with the residual liquor and the resulting mixture is sent to the rock salt deposit.

7. The process according to claim 1, wherein said residue is obtained by desulphurizing a gas containing sulphur oxides, said gas resulting from combustion of a fossil fuel which contains sulfur, with sodium bicarbonate.

8. The process according to claim 7, wherein the process of desulphurizing a sulphur oxide containing gas with sodium bicarbonate is a dry process.

9. The process according to claim 7, wherein a quantity of calcium chloride is employed which is sufficient to convert all the sodium sulphate and the sodium carbonate resulting from the desulphurization into calcium sulphate and calcium carbonate respectively.

10. The process according to claim 9, wherein the calcium sulphate and the calcium carbonate are transferred to the rock salt deposit with a quantity of water which is sufficient to dissolve a volume of the rock salt deposit which is at least equal to the total volume of the calcium sulphate and of the calcium carbonate.

11. The process according to claim 2, wherein the aqueous solution of sodium chloride (16) withdrawn from the rock salt deposit is reacted with a fraction of the sodium sulphate decahydrate to precipitate the calcium ions in the solution in the form of calcium sulphate.

12. A process for removing sodium sulphate from a residue containing sodium sulphate, comprising the following successive steps:

dispersing a residue containing sodium sulphate in water and dissolving said sodium sulphate in said water to form an aqueous dispersion containing an aqueous sodium sulphate solution; and separating said aqueous solution from the aqueous dispersion, and cooling the solution to crystallize sodium sulphate decahydrate, which is reacted with the calcium salt.

* * * * *